Sept. 26, 1933.  R. W. MUELLER  1,928,071
BALANCED RELIEF VALVE CONSTRUCTION
Filed May 8, 1929  2 Sheets-Sheet 1

Inventor
R. W. Mueller
By W. G. Doolittle
Attorney

Sept. 26, 1933.  R. W. MUELLER  1,928,071
BALANCED RELIEF VALVE CONSTRUCTION
Filed May 8, 1929  2 Sheets-Sheet 2
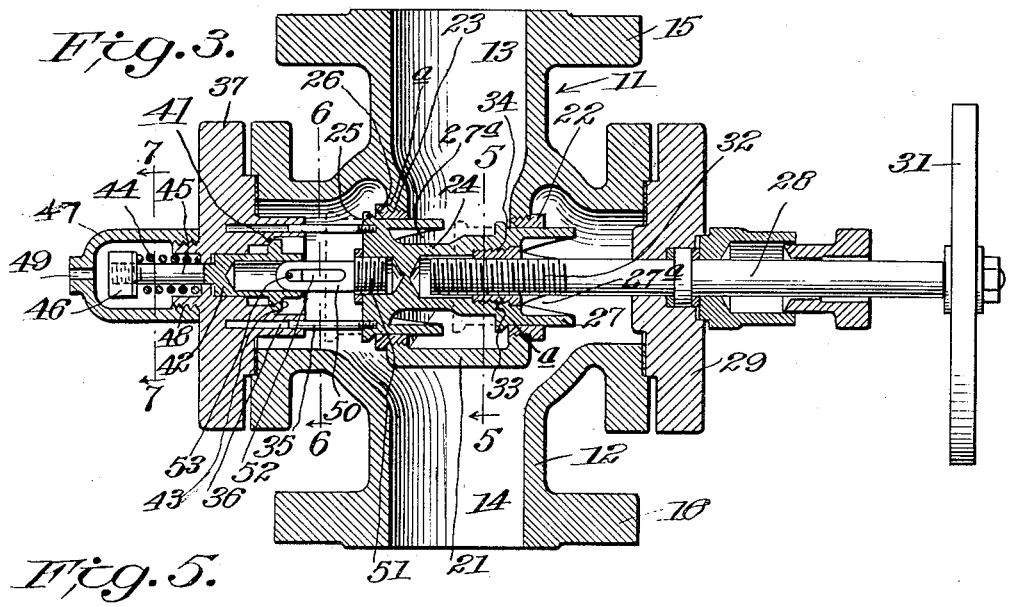
Fig. 3.
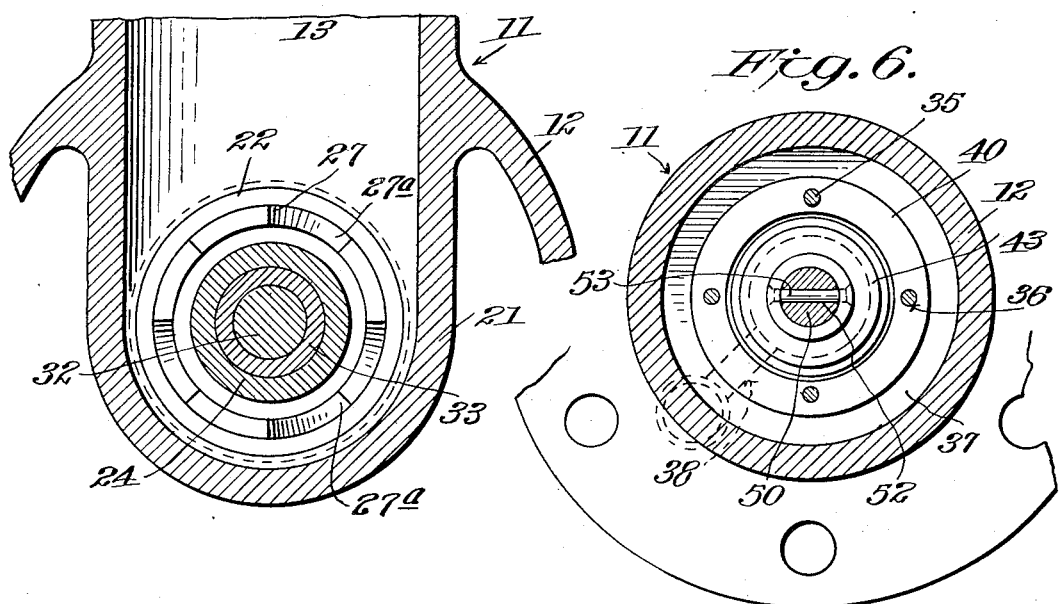
Fig. 5.
Fig. 6.
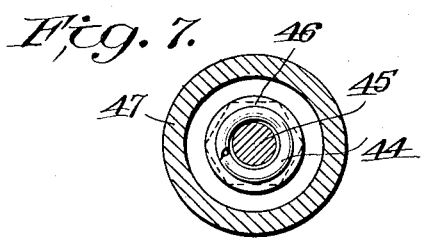
Fig. 7.
Inventor
R. W. Mueller
W. F. Doolittle
By  Attorney Patented Sept. 26, 1933

1,928,071

UNITED STATES PATENT OFFICE 1,928,071

BALANCED RELIEF VALVE CONSTRUCTION

Richard W. Mueller, Pittsburgh, Pa., assignor to Kerotest Manufacturing Company, Pittsburgh, Pa., a corporation of Pennsylvania Application May 8, 1929. Serial No. 361,276

10 Claims. (Cl. 277—9)

This invention relates to a balanced relief valve construction of the general type used for controlling the admission of steam or other power fluid to a steam engine or the like and for instance an engine as used for rotary drilling purposes in the oil fields.

A prime object is to provide a more efficient valve construction in which there will be positive communication between the engine or machine side thereof and the atmosphere when the throttle valve is closed so that leaking steam or power fluid cannot build up a pressure and cause partial operation of the engine and consequent injury to workmen who may be adjacent the working or movable parts of the controlled engine or apparatus.

A further important object is to provide a means whereby the power fluid cannot pass the throttle valve until the exhaust or auxiliary valve is seated or closed.

Other objects are, to provide in a construction of the character specified, a balanced throttle valve with means for effecting a positive exhaust to the atmosphere when the valve is closed; to provide a novel combination of a balanced valve and a non-rising stem; and to provide guide means associated with the balanced valve to prevent turning thereof during its opening and closing movements.

In the accompanying drawings, which illustrate an application of my invention:

Fig. 3 is a section taken on the same plane as Fig. 2, but showing the throttle valve in position at the start of an opening movement, the open position being suggested in dotted lines, and the auxiliary or exhaust valve being shown in closed position;

Fig. 5 is an enlarged section taken on the line 5—5 of Fig. 3;

Fig. 6 is an enlarged section taken on the line 6—6 of Fig. 3; and

Fig. 7 is an enlarged section taken on the line 7—7 of Fig. 3.

Figure 1:
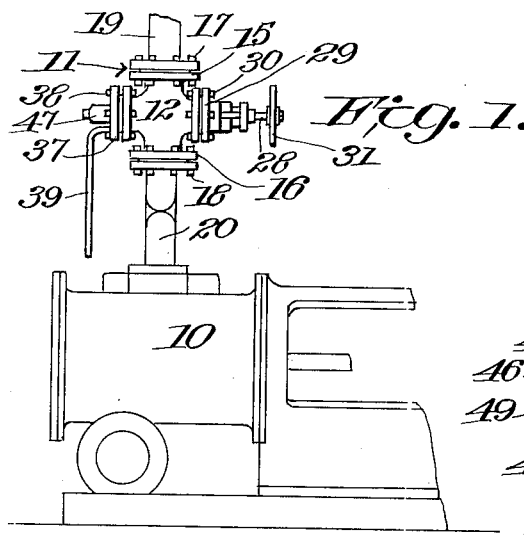
Fig. 1 is a fragmentary elevation of a drilling engine as used in the oil fields having my invention applied thereto.

Referring specifically to the drawings wherein like reference characters designate like or corresponding parts in the different views, a steam engine is fragmentarily and conventionally shown in Fig. 1 as at 10 and may be of the type extensively used in the oil fields for rotary drilling operations, although the valve is capable of use generally in connection with fluid operated motors or apparatus.

The valve structure constituting my invention is generally designated 11. The same has a casting or body at 12 equipped with a steam-receiving passage 13 and a steam discharging passage at 14, which is arranged at the engine or machine side of the valve. Said passages 13 and 14 respectively have attaching flanges 15 and 16 which are bolted, as at 17 and 18 to steam pipes 19 and 20, the former of which supplies steam to the valve from any suitable source and the latter of which conducts the steam which passes the valve, to the cylinder or cylinders of the engine 10.

Integral with and interiorly of the body 12, is a chamber 21 which constitutes a steam chest. The opposite sides of the chamber 21 has steam outlet ports in which valve seat members 22 are screw-threaded, as at 23. A balanced valve 24 is provided with head flanges at 25 adapted for engagement with inclined seats 26 on the seat members 22 and with solid annular portions $a$.

The said balanced valve 24 is adapted for sliding movement axially of the ports or valve seat members 22 and the same is provided with guide flanges 27 which insure a steady movement of the valve and accurate positioning thereof. These flanges are spaced apart and the openings 27$a$ therebetween provide fluid passages. A non-rising operating stem for the valve is provided at 28, being suitably rotatably mounted in a closure or plate 29 at one side of the valve, removably bolted thereto as at 30. The stem 28 cannot slide through the head 29 and is equipped with a wheel or other means 31 whereby the same may be rotated. Valve stem 28 has right-hand screw-threads at 32 which engage mating screw-threads provided on the balanced valve 24 and preferably on a bushing 33 screw-threaded at 34 into the balanced valve. As a result of this construction, the valve moves to the right in the drawings, to closed position; and to the left, to open position. When such balanced valve 24 is in open position, as suggested by the dotted lines in Fig. 3, steam or power fluid passes from the passageway 13, through the ports in the steam chest 21, past the valve head members 25 and into the passageway 14, and thence into pipe 20 and to the cylinder or cylinders of the engine or other apparatus using the same.

The balanced valve 24 is guided in its sliding movement and held against rotation by means of any suitable number of pins or rods 35 which may be screwed to the valve 25 and slidably disposed in sockets 36 provided in a closure or plate 37 bolted at 38 to one side of the valve body 12.

Figure 4:
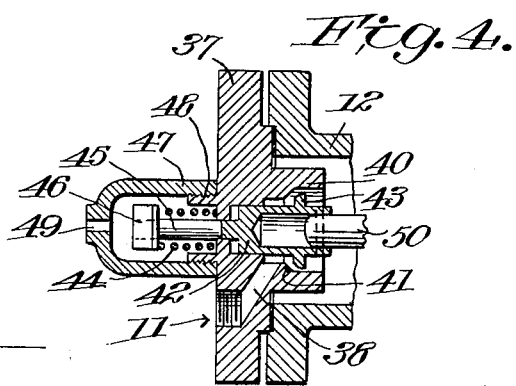
Fig. 4 is a detail section illustrating the position of the exhaust passageway at the engine side of the valve.

Said valve body at the passageway 14 or machine side thereof, is adapted for positive communication with the atmosphere when the balanced valve 24 is closed and, for instance, through a passageway 38 formed in the plate 37, as best shown in Figs. 4 and 6. A pipe 39 may be screwthreaded into the passageway 38 so as to conduct the exhaust to any desired point. The inner extremity of passageway 38 opens into an enlargement 40 on the plate 37 which has an interior valve seat at 41. A valve member 42 is slidably mounted in the plate 37 and its enlargement and is provided with a seat or flange 43 adapted for engagement with the seat 41 and such valve 42 is urged to a position where the seats 43 and 41 engage, as by means of an expansive spring 44 surrounding a stem 45 on valve 42 and abutting plate 37 and a nut or other abutment 46 on said stem 45. A protecting bonnet 47 surrounds the spring 44 and adjacent parts, being detachably threaded at 48 to the plate 37 and having a vent opening 49 therein. A link 50 is screw-threaded, as at 51, in one end of the balanced valve 24 and is provided with an elongated slot 52 through which a pin 53 passes, the latter being carried by the valve 42.

Figure 2:
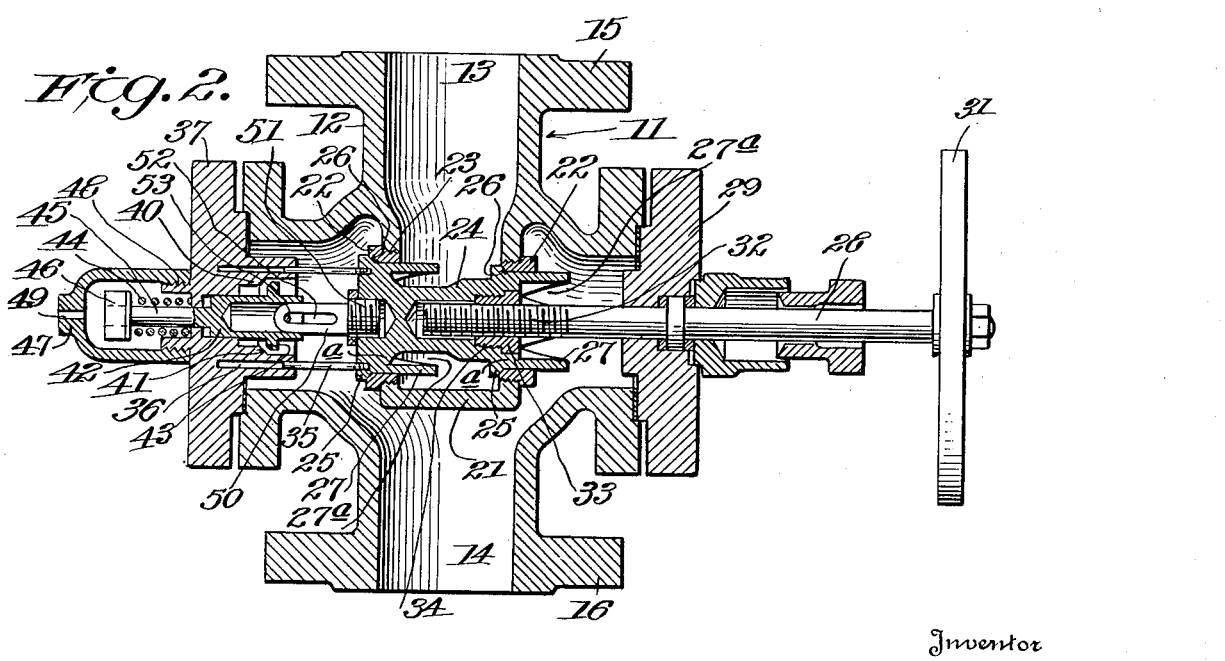
Fig. 2 is a central vertical sectional view taken through the valve structure constituting my invention, the throttle valve being shown in closed position.

As a result of the construction described, and with particular reference to Fig. 2, when the throttle valve 24 is closed, the exhaust or auxiliary valve 42 is open so that any steam or power fluid which may leak past the valve seats 26, will exhaust to the atmosphere through the enlargement 40, passageway 38 and pipe 39. In such position, the spring 44 is under tension and, hence, it constantly urges the valve 42 to closed position where the seats 41 and 43 engage. The balanced throttle valve 24 is of such proportion and configuration, including the solid portions *a* and passages 27*a*, that in moving to open position, through turning of the wheel 31 and stem 28, the valve 42 will move to closed position through the action of spring 44 before the balanced throttle valve starts to open. Thus, there is provided a connection between the valves that is operable independent of the throttle valve operating means, whereby the valve 42 may be moved to closed position.

When the valve 42 is seated, the throttle valve 24 will start to open and may continue to open since the relative movement between that valve and the auxiliary valve 42 may take place because of the presence of elongated slot 52. On the contrary, when the valve 24 is moved to closed position, it will close partially, before the valve 42 starts to open. Thus when valve 24 partially closes, the link 50 will contact with the pin 53 and thus draw the valve 42 to open position against the tension of spring 44 while the valve 24 completes its closing movement.

It will be seen that the auxiliary valve 42 operating as described, provides a positive means whereby power fluid escaping past the throttle valve will be delivered into the atmosphere rather than to the engine 10 and hence a means is provided whereby the engine positively will not operate because of escaping steam or back pressure and, therefore, the engine cannot accidentally operate even for a portion of a cycle and possibly, injure workmen adjacent to the working or movable parts thereof.

Various changes may be resorted to provided they fall within the spirit and scope of the invention.

I claim as my invention:

1. In a power fluid admission valve structure, a valve body, a steam chest within the body having outlet ports, a double throttle valve in said body to control the passage of power fluid through the chest ports, operating means for said valve, said body having an exhaust passage leading from its outlet side, and a valve for said exhaust passage open when the throttle valve is closed and controlled as to position by the throttle valve independently of said operating means.

2. In a power fluid admission valve structure, a valve body, a steam chest within the body having outlet ports a double throttle valve in said body to control the passage of power fluid through the chest ports, operating means for said valve, said body having an exhaust passage leading from its outlet side, a valve for said exhaust passage, and a connection permitting relative movement between said valves independently of said operating means whereby the second valve may assume a closed position while the throttle valve is in open position.

3. In a power fluid admission valve structure, a valve body, a slidable and non-rotatable throttle valve in said body to control the passage of power fluid therethrough, operating means for said valve said body having an exhaust passage leading from its outlet side, a valve for said exhaust passage; and a connection permitting relative movement between said valves independently of the operating means whereby the second valve may assume a closed position while the throttle valve is in open position and whereby the second valve will assume its closed position before the throttle valve opens.

4. In a power fluid admission valve structure, a throttle valve therein, operating means therefor an exhaust valve for the outlet side of the valve structure, one of said valves being adapted to assume an open position while the other valve assumes a closed position and vice versa, means independently of said operating means and directly connecting said valves for relative movement whereby the exhaust valve may close prior to opening of the throttle valve.

5. In a power fluid admission valve structure, a throttle valve therein, operating means for the throttle valve, an exhaust valve on the outlet side of the valve structure maintained open by the throttle valve when the latter is closed, means urging the exhaust valve to closed position, and means independent of the operating means connecting said valves for relative movement whereby the exhaust valve may close prior to opening of the throttle valve.

6. In a power fluid admission valve structure, a chest having outlet ports in opposite walls, a throttle valve bridging and adapted to control said ports, operating means for the valve on one side of said chest, an exhaust valve on the outlet side of the valve structure maintained open by the throttle valve when the latter is closed, and means on the other side of the chest and outwardly of the path of the power fluid urging the exhaust valve to closed position.

7. In a power fluid admission valve structure, a body, a steam chest within the body having outlet ports, a double throttle valve therein to control the passage of steam through the chest, an operating means therefor, said body having an exhaust passage leading from the outlet side thereof to the atmosphere, a valve for said passage, means urging the latter valve to its seat, and a pin and elongated slot connection between the valves and independent of said operating means whereby one valve will be open while the other valve is closed and vice versa.

8. In a power fluid admission valve structure, a body, a throttle valve therein, an operating means therefor, said body having an exhaust passage leading from the outlet side thereof to the atmosphere, a valve for said passage, means urging the latter valve to its seat, and a pin and elongated slot connection between the valves and independent of said operating means whereby one valve will be open while the other valve is closed and vice versa and the throttle valve in moving to open position, will remain closed until the other valve is seated.

9. In a power fluid admission valve structure, a body having a steam chest, a balanced valve controlling the outlet from said steam chest, a plate on said body having an exhaust port therethrough communicating with the atmosphere and having a seat adjacent the same, a valve for the latter seat, a non-rising stem screw-threaded to the balanced valve turnable to slide the latter, guide pins on the balanced valve, said plate having sockets engaged by said guide pins, a link extending directly from the balanced valve provided with an elongated slot, and a pin disposed in said slot and carried by the second mentioned valve, whereby one valve will be closed while the other is open and vice versa, and each valve cannot be opened until the other valve is closed.

10. In a power admission valve structure, a body having a steam chest, a balanced valve controlling the outlet from said steam chest, plates closing the body on opposite sides of the valve chest, a non-rising stem operatively connected to the valve through one of said plates, the other plate having a passage for the exhaust of power fluid therethrough when said valve is closed, an exhaust valve for said passage extending outwardly beyond the plate, means engaging the exhaust valve and adjacent plate urging seating of the exhaust valve, and a pin and slot connection between said valves independent of said stem.

RICHARD W. MUELLER.